(12) United States Patent
Lee et al.

(10) Patent No.: US 10,379,552 B2
(45) Date of Patent: Aug. 13, 2019

(54) METHOD FOR OPTIMIZING CONTROL PARAMETERS OF COOLING FAN AND SYSTEM THEREOF

(71) Applicants: Inventec (Pudong) Technology Corp., Shanghai (CN); Inventec Corporation, Taipei (TW)

(72) Inventors: Cheng-Ming Lee, Taipei (TW); Kai-Yang Tung, Taipei (TW); Mao-Ching Lin, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 235 days.

(21) Appl. No.: 15/469,593

(22) Filed: Mar. 27, 2017

(65) Prior Publication Data

US 2018/0088610 A1   Mar. 29, 2018

(30) Foreign Application Priority Data

Sep. 29, 2016 (CN) .......................... 2016 1 0866171

(51) Int. Cl.
 *G05B 11/42* (2006.01)
 *G05D 23/19* (2006.01)
(52) U.S. Cl.
 CPC ..... *G05D 23/1951* (2013.01); *G05D 23/1917* (2013.01); *G05D 23/1919* (2013.01)
(58) Field of Classification Search
 CPC .............. G05B 13/024; G05B 13/0205; G05B 2219/13103; G05D 23/1919; G05D 23/1931; G06F 1/206; G06F 11/3051; G06F 1/20; G06F 2200/201
 See application file for complete search history.

(56) References Cited

U.S. PATENT DOCUMENTS

| | | | | |
|---|---|---|---|---|
| 7,098,617 B1* | 8/2006 | Oljaca | .................... | G06F 1/206 318/268 |
| 7,138,781 B2* | 11/2006 | Murray | ................ | G05B 13/024 318/400.04 |
| 7,890,215 B2* | 2/2011 | Duncan | ................. | F24F 5/0035 62/179 |
| 7,979,143 B2* | 7/2011 | Koo | ........................ | G05B 11/42 700/37 |
| 2003/0094004 A1* | 5/2003 | Pham | ........................ | A47F 3/04 62/126 |
| 2006/0108962 A1* | 5/2006 | Murray | ................ | G05B 13/024 318/610 |

(Continued)

*Primary Examiner* — Darrin D Dunn
(74) *Attorney, Agent, or Firm* — Winston Hsu

(57) ABSTRACT

After a temperature point of the cooling fan is set according to a plurality of temperatures corresponding to a plurality of first consecutive time intervals, control a duty cycle of the cooling fan according to the temperature point, acquire temperature variation data of the cooling fan during a plurality of second consecutive time intervals, generate a gain factor and a frequency factor of the cooling fan according to the temperature variation data, and generate a proportional gain factor, an integral time factor and a derivative time factor of a proportional-integral-derivative controller of the cooling fan according to the gain factor and the frequency factor of the cooling fan. The plurality of first consecutive time intervals are followed by the plurality of second consecutive time intervals.

8 Claims, 5 Drawing Sheets

(56) References Cited

U.S. PATENT DOCUMENTS

| | | | | |
|---|---|---|---|---|
| 2006/0181232 A1* | 8/2006 | Oljaca | ............... | G06F 1/206 |
| | | | | 318/268 |
| 2010/0073011 A1* | 3/2010 | Svidenko | ............... | G01J 1/02 |
| | | | | 324/537 |
| 2012/0291984 A1* | 11/2012 | Li | ............... | F24F 11/77 |
| | | | | 165/11.1 |
| 2013/0196038 A1* | 8/2013 | Liu | ............... | A47J 37/1266 |
| | | | | 426/233 |
| 2015/0086383 A1* | 3/2015 | Toy | ............... | F04D 25/088 |
| | | | | 417/32 |
| 2015/0156917 A1* | 6/2015 | Ogawa | ............... | H05K 7/207 |
| | | | | 361/695 |
| 2017/0255211 A1* | 9/2017 | Haigh | ............... | G06F 1/206 |
| 2018/0032114 A1* | 2/2018 | Hovis | ............... | G05B 15/02 |
| 2018/0100665 A1* | 4/2018 | Brunstetter | ............... | F24F 11/30 |

\* cited by examiner

METHOD FOR OPTIMIZING CONTROL PARAMETERS OF COOLING FAN AND SYSTEM THEREOF

BACKGROUND OF THE INVENTION

1. Field of the Invention

The present invention illustrates a method for optimizing control parameters of a cooling fan, and more particularly, the method for optimizing proportional-integral-derivative controller (PID) parameters of the cooling fan.

2. Description of the Prior Art

With advancement of techniques, various electronic devices are required to achieve high performance and small circuit size. As known, when an electronic device is designed to provide high performance and small circuit size, power consumption and heat generation rate are increased. Thus, a cooling process and a heat dissipation management become two key issues for electronic device design (i.e., such as a personal computer or a server). In general, most electronic devices use a forced convection method to achieve heat dissipation. In the forced convection method, the heat is transferred from a heat source to ambient air. The heat dissipation performance can be improved if the convection is strong. To generate strong convection, various cooling fans are introduced to the electronic devices for facilitating improved heat dissipation.

In general, a proportional-integral-derivative controller is introduced to the cooling fan for controlling operations of the cooling fan. Parameters of the proportional-integral-derivative controller associate with revolutions per minute (RPM) of the cooling fan and RPM adjustment (or say, adjustment acknowledgment) of the cooling fan. The parameters also associate with a rising time, a peak overshoot value, a steady-state error, and a stability response. However, only a trial and error process can be used to adjust the parameters of the proportional-integral-derivative controller. As a result, the trial and error process-based method for adjusting the parameters cannot achieve optimal operational status of the proportional-integral-derivative controller. For example, in the proportional-integral-derivative controller, the circuit response of the cooling fan can be improved when the proportional gain factor is optimized. However, an abnormally high proportional gain factor leads to a high peak overshoot value in conjunction with unstable revolutions of the cooling fan. The steady-state error is substantially equal to zero when the integral time factor is optimized. However, an abnormally high integral time factor leads to a high peak overshoot value of the cooling fan. The peak overshoot value can be reduced when the derivative time factor is optimized. However, an improper derivative time factor leads to noise enhancement of the cooling fan, thereby reducing the stability.

Thus, when the parameters of the proportional-integral-derivative controller are adjusted by using the trial and error process-based method, operations of the cooling fan cannot be optimized. The cooling fan may be operated in unstable condition (i.e., fan jittering) and thus consumes additional power.

SUMMARY OF THE INVENTION

In an embodiment of the present invention, a method for optimizing control parameters of a cooling fan is disclosed. The method comprises setting an temperature point of the cooling fan according to a plurality of temperatures corresponding to a plurality of first consecutive time intervals, controlling a duty cycle of the cooling fan according to the temperature point, acquiring temperature variation data of the cooling fan during a plurality of second consecutive time intervals, generating a gain factor and a frequency factor of the cooling fan according to the temperature variation data, and generating a proportional gain factor, an integral time factor and a derivative time factor of a proportional-integral-derivative controller of the cooling fan according to the gain factor and the frequency factor of the cooling fan. The plurality of first consecutive time intervals are followed by the plurality of second consecutive time intervals.

In another embodiment of the present invention, a cooling fan system is disclosed. The cooling fan system includes a cooling fan, a temperature sensor, and a processor. The cooling fan is configured to dissipate heat from an electronic device according to a plurality of control parameters. The temperature sensor is coupled to the electronic device and configured to detect a temperature. The processor is coupled to the cooling fan and the temperature sensor and configured to generate the plurality of control parameters for driving the cooling fan. The processor sets an temperature point of the cooling fan according to a plurality of temperatures corresponding to a plurality of first consecutive time intervals, controls a duty cycle of the cooling fan according to the temperature point, acquires temperature variation data of the cooling fan during a plurality of second consecutive time intervals, generates a gain factor and a frequency factor of the cooling fan according to the temperature variation data, and generates a proportional gain factor, an integral time factor and a derivative time factor of a proportional-integral-derivative controller of the cooling fan according to the gain factor and the frequency factor. The plurality of first consecutive time intervals are followed by the plurality of second consecutive time intervals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
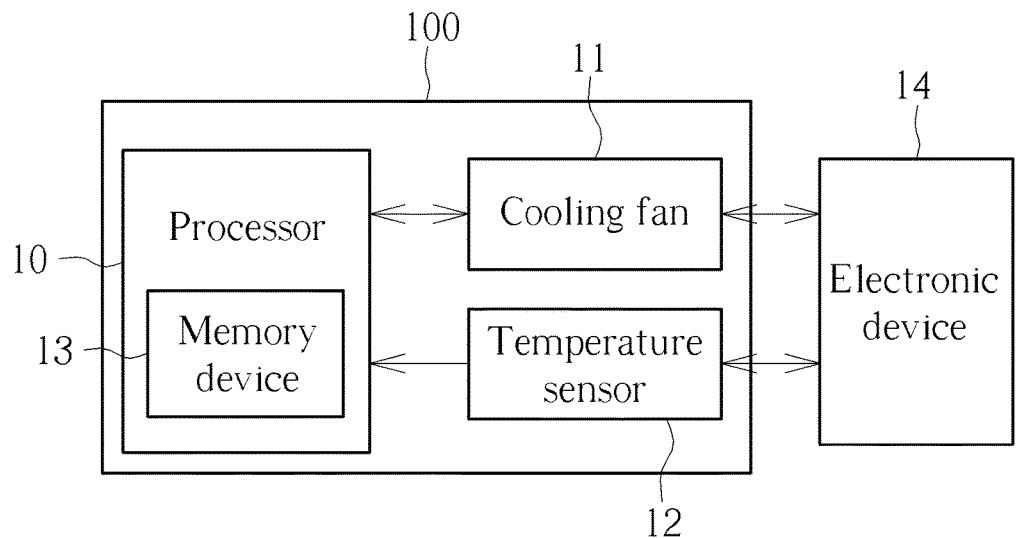
FIG. 1 is a block diagram of a cooling fan system for optimizing control parameters according to an embodiment of the present invention.

FIG. 1 is a block diagram of a cooling fan system 100 for optimizing control parameters. In the embodiment, the control parameters are denoted as the proportional-integral-derivative (PID) controller parameters of a cooling fan 11. In other words, the system 100 can test the cooling fan 11 automatically and generate optimal PID parameters, such as a proportional gain factor, an integral time factor, and a derivative time factor. Thus, instead of using a trial and error process-based method for generating PID parameters, the cooling fan system 100 can be regarded as a generator for generating optimal PID parameters. In FIG. 1, the system 100 includes a processor 10, the cooling fan 11 and a temperature sensor 12. The cooling fan 11 can be coupled to an electronic device 14. For example, the cooling fan 11 can be coupled to a central processing unit (CPU), a dual in-line memory module (DIMM), or a graphic card of a server. The temperature sensor 12 is coupled to the electronic device 14 for detecting a temperature of the electronic device 14. The processor 10 can be any programmable device, such as a personal computer, a chip, a control board, or a microcontroller unit. The processor 10 is coupled to the cooling fan 11 and the temperature sensor 12 for generating the PID parameters. The processor 10 can include a memory device 13 for storing temperature variation data outputted by the temperature sensor 12. A method for optimizing the PID parameters is illustrated below.

Figure 2:
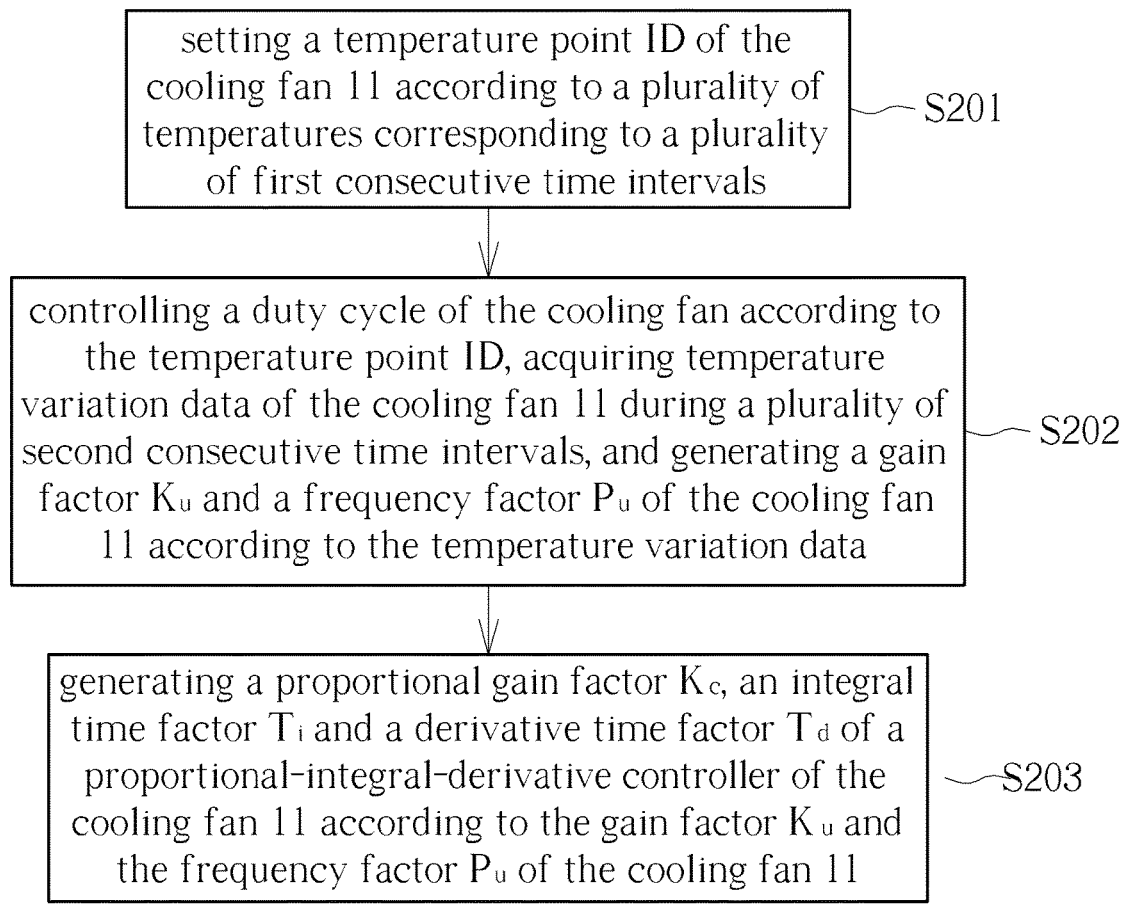
FIG. 2 is a flow chart of a method for optimizing control parameters of the cooling fan in FIG. 1.

FIG. 2 is a flow chart of a method for optimizing the PID parameters of the cooling fan 11. The method for optimizing the PID parameters can be regarded as a machine learning method, including step S201 to step S203, written as step S201: setting a temperature point ID of the cooling fan 11 according to a plurality of temperatures corresponding to a plurality of first consecutive time intervals;

step S202: controlling a duty cycle of the cooling fan according to the temperature point ID, acquiring temperature variation data of the cooling fan 11 during a plurality of second consecutive time intervals, and generating a gain factor $K_u$ and a frequency factor $P_u$ of the cooling fan 11 according to the temperature variation data;

step S203: generating a proportional gain factor $K_c$, an integral time factor $T_i$ and a derivative time factor $T_d$ of a proportional-integral-derivative controller of the cooling fan 11 according to the gain factor $K_u$ and the frequency factor $P_u$ of the cooling fan 11.

Here, step S201 to step S203 are illustrated below. The detail principles and examples of step S201 to step S203 are also illustrated later. Since the cooling fan 11 is disposed on the electronic device 14, heat dissipation can be achieved by using a forced convection method which heat can be transferred from the electronic device 14 to ambient air through the cooling fan 11. Thus, a temperature of the cooling fan 11 is substantially equal to a temperature of the electronic device 14 detected by the temperature sensor 12 since the cooling fan 11 adjoins the electronic device 14 closely. In other words, a convection path is generated from the electronic device 14 to the cooling fan 11. In step S201, the plurality of temperatures of the cooling fan 11 corresponding to a plurality of first consecutive time intervals are detected. For example, the temperature sensor 12 can sample temperatures during a predetermined time period. Thus, the plurality of temperatures in step S201 can be regarded as a plurality of sampled temperatures in consecutive time intervals. The processor 10 can generate the temperature point ID of the cooling fan 11 according to the plurality of sampled temperatures by invoking an algorithm. Particularly, the temperature point ID can be regarded as a temperature of the cooling fan 11 operated under a stable condition. In step S202, the processor 10 can control the duty cycle of the cooling fan 11 and acquiring temperature variation data of the cooling fan 11 during a plurality of second consecutive time intervals. Here, the plurality of first consecutive time intervals are followed by the plurality of second consecutive time intervals. In other words, in step S201, a relay feedback process can be introduced. The temperature point ID of the cooling fan 11 can be generated during the plurality of first consecutive time intervals. Then, in step S202, the processor 10 controls the duty cycle of the cooling fan 11 and further monitors temperature variation of the cooling fan 11. In step S202, the processor 10 can store temperature data variation during the plurality of second consecutive time intervals. Then, when the data of the temperature variation is sufficient statistic, the processor 10 can generate the gain factor $K_u$ and the frequency factor $P_u$ of the cooling fan 11 according to the temperature variation data. Definitions of the gain factor $K_u$ and the frequency factor $P_u$ are illustrated later. In step S203, the processor 10 can generate the proportional gain factor $K_c$, the integral time factor $T_i$ and the derivative time factor $T_d$ of the PID controller of the cooling fan 11 according to the gain factor $K_u$ and the frequency factor $P_u$. Specifically, the processor 10 can use any reasonable method to generate the proportional gain factor $K_c$, the integral time factor $T_i$ and the derivative time factor $T_d$. For example, the processor 10 can generate PID parameters by using specific equations. The generation method is also illustrated later. Briefly, three steps are introduced for optimizing the PID parameters of the cooling fan 11. Step S201 can be regarded as a "preprocessing process". Step S202 can be regarded as a "system identification process". Step S203 can be regarded as a "PID parameters calculation process".

Figure 3:
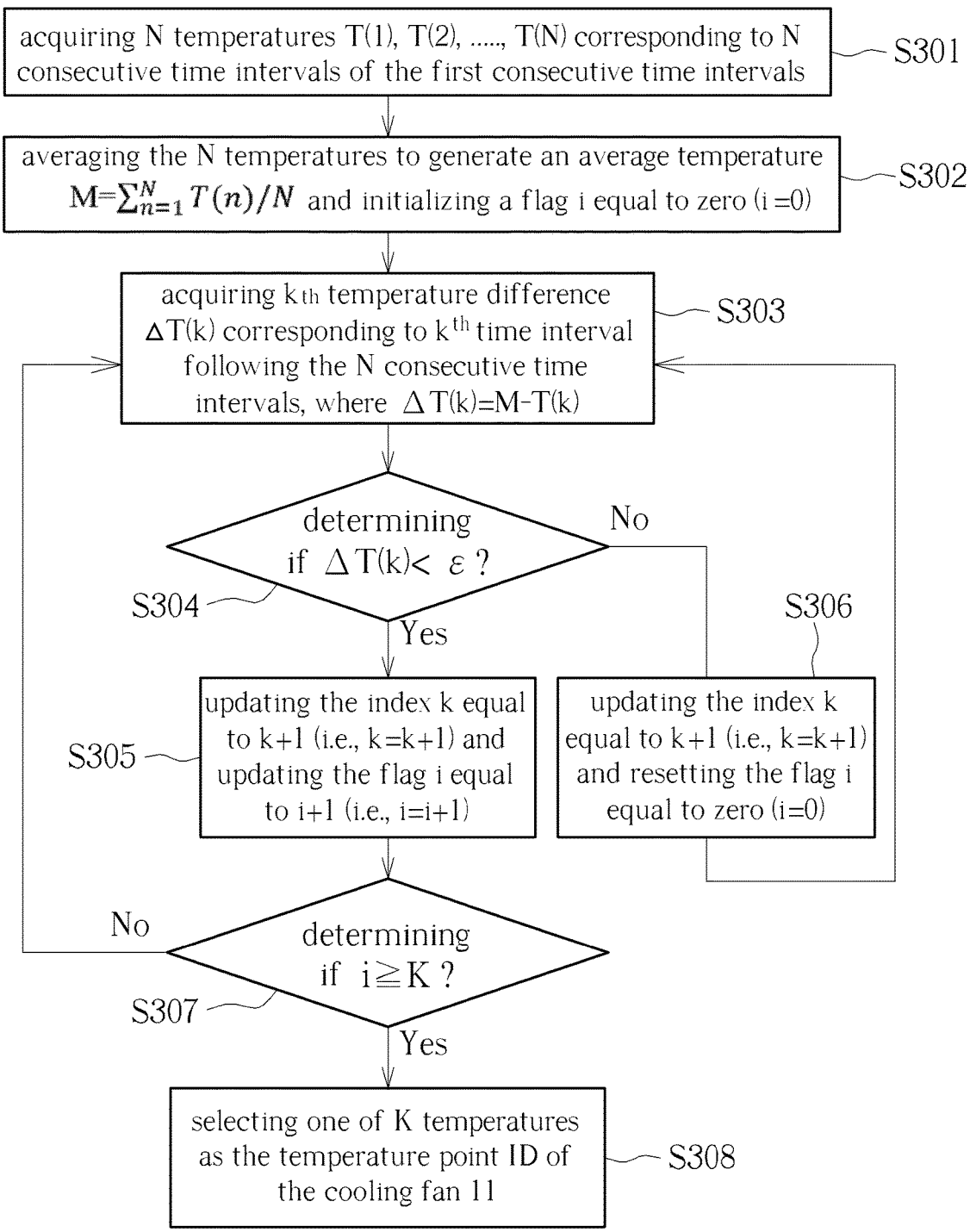
FIG. 3 is a flow chart of a preprocessing process in FIG. 2.

FIG. 3 is a flow chart of a preprocessing process. As aforementioned illustration, the preprocessing process corresponds to step S201. The preprocessing process includes step S301 to step S308, written as step S301: acquiring N temperatures $T(1), T(2), \ldots, T(N)$ corresponding to N consecutive time intervals of the first consecutive time intervals;

step S302: averaging the N temperatures to generate an average temperature $M=\Sigma_{n=1}^{N} T(n)/N$, and initializing a flag i equal to zero (i=0);

step S303: acquiring $k^{th}$ temperature difference $\Delta T(k)$ corresponding to $k^{th}$ time interval following the N consecutive time intervals, where $\Delta T(k)=M-T(k)$;

step S304: determining if $\Delta T(k)<\varepsilon$? If so, executing step S305, else executing step S306;

step S305: updating the index k equal to k+1 (i.e., k=k+1), updating the flag i equal to i+1 (i.e., i=i+1), and executing step S307;

step S306: updating the index k equal to k+1 (i.e., k=k+1), resetting the flag i equal to zero (i=0), and going back to step S303;

step S307: determining if i≥K? If so, executing step S308, else going back to step S303;

step S308: selecting one of K temperatures as the temperature point ID of the cooling fan 11.

In step S301, the temperature sensor 12 acquiring the N temperatures of the cooling fan 11 corresponding to the N consecutive time intervals of the first consecutive time intervals. For example, the temperature sensor 12 can detect temperatures $T(1), T(2), \ldots T(N)$. Specifically, the temperatures $T(1), T(2), \ldots T(N)$ can be regarded as N temperatures sampled by the temperature sensor 12. In the embodiment, N is a user-defined positive integer greater than two. When N is sufficiently large, a set of sampled temperatures is also spanned, thereby leading to high reliability. Then, in step S302, the processor 10 averages the N temperatures to generate the average temperature $m=\Sigma_{n=1}^{N}T(n)/N$, and initializes the flag i equal to zero (i=0). However, any method for counting process can be introduced. For example, a flag-based method can be introduced to the embodiment. The embodiment can also use a counter for counting process. After the N temperatures are sampled during the N consecutive time intervals and the average temperature M is calculated, the temperature sensor 12 is performed to continue detecting temperatures. In step S303, the temperature sensor 12 acquires $k^{th}$ temperature difference $\Delta T(k)$ corresponding to $k^{th}$ time interval following the N consecutive time intervals. Here, k is denoted as an index of $k^{th}$ time interval. The temperature difference $\Delta T(k)$ is defined as $\Delta T(k)=M-T(k)$. For example, after the N consecutive time intervals, the temperature sensor 12 acquires a temperature $T(k=1)$. Then, the processor 10 can generate a temperature difference $\Delta T(k=1)$ by using $\Delta T(k=1)=M-T(k=1)$. In the following, the temperature sensor 12 acquires a temperature $T(k=2)$. Then, the processor 10 can generate a temperature difference $\Delta T(k=2)$ by using $\Delta T(k=2)=M-T(k=2)$. Without loss of generality, the temperature difference of the $k^{th}$ time interval is denoted as $\Delta T(k)$ in step S303. Further, as aforementioned illustration, the temperature difference $\Delta T(k)$ is defined as a difference between a sampled temperature $T(k)$ and the average temperature M. In step S304, the processor 10 determines if $\Delta T(k)<\varepsilon$. If $\Delta T(k)<\varepsilon$, execute step S305, else executing step S306. Here, $\varepsilon$ is a tolerance value (i.e., a user defined value or a system built-in value), such as 0.01. In step S304, stability of temperature of cooling fan 11 can be determined based on the temperature difference $\Delta T(k)$. When the temperature difference $\Delta T(k)$ is greater than the tolerance value $\varepsilon$ (i.e., $\Delta T(k)>\varepsilon$), it implies that the cooling fan 11 is operated under unstable condition. Thus, in step S306, the flag i is reset equal to zero. The index k becomes k+1. The processor 10 executes the step S303 again for processing a loop including the step S303, the step S304, and the step S306. When the temperature difference $\Delta T(k)$ is smaller than the tolerance value $\varepsilon$ (i.e., $\Delta T(k)<\varepsilon$), it implies that the cooling fan 11 is operated under stable condition. Thus, in step S305, the flag i becomes i+1. The index k becomes k+1. In other words, a value of the flag i can be regarded as the number of time intervals of the cooling fan 11 continuously operated under the stable condition. Thus, In step S307, the processor 10 determines if $i \geq K$. When $i \geq K$, executing step S308. When i<K, going back to step S303. Here, K is a positive integer greater than 2 and $K \geq k \geq 1$. In other words, when K temperature differences (i.e., $\Delta T(k=1)$ to $\Delta T(k=K)$) are all smaller than the tolerance value $\varepsilon$, it implies that the number of time intervals of the cooling fan 11 continuously operated under the stable condition reaches to K. Then, in step S308, the processor 10 selects one of K temperatures to be the temperature point ID of the cooling fan 11. The processor 10 can also average K temperatures to be the temperature point ID of the cooling fan 11. On the contrary, when the number of time intervals of the cooling fan 11 continuously operated under the stable condition has not reached K, go back to step S303 for processing a loop including step S303 to step S307.

Briefly, the aforementioned steps S301 to S308 can be regarded as a relay feedback process. When K temperature differences of the K consecutive time intervals are all smaller than the tolerance value $\varepsilon$, the cooling fan 11 is operated under the stable condition. Thus, the temperature point ID can be determined by the processor 10. When at least one of the K temperature differences is greater than the tolerance value $\varepsilon$, the cooling fan 11 is operated under the unstable condition. Hereafter, the temperature sensor 12 resamples temperatures of the cooling fan 11 until the cooling fan 11 is stable. By doing so, the temperature point ID can be generated by the processor 10.

Figure 4:
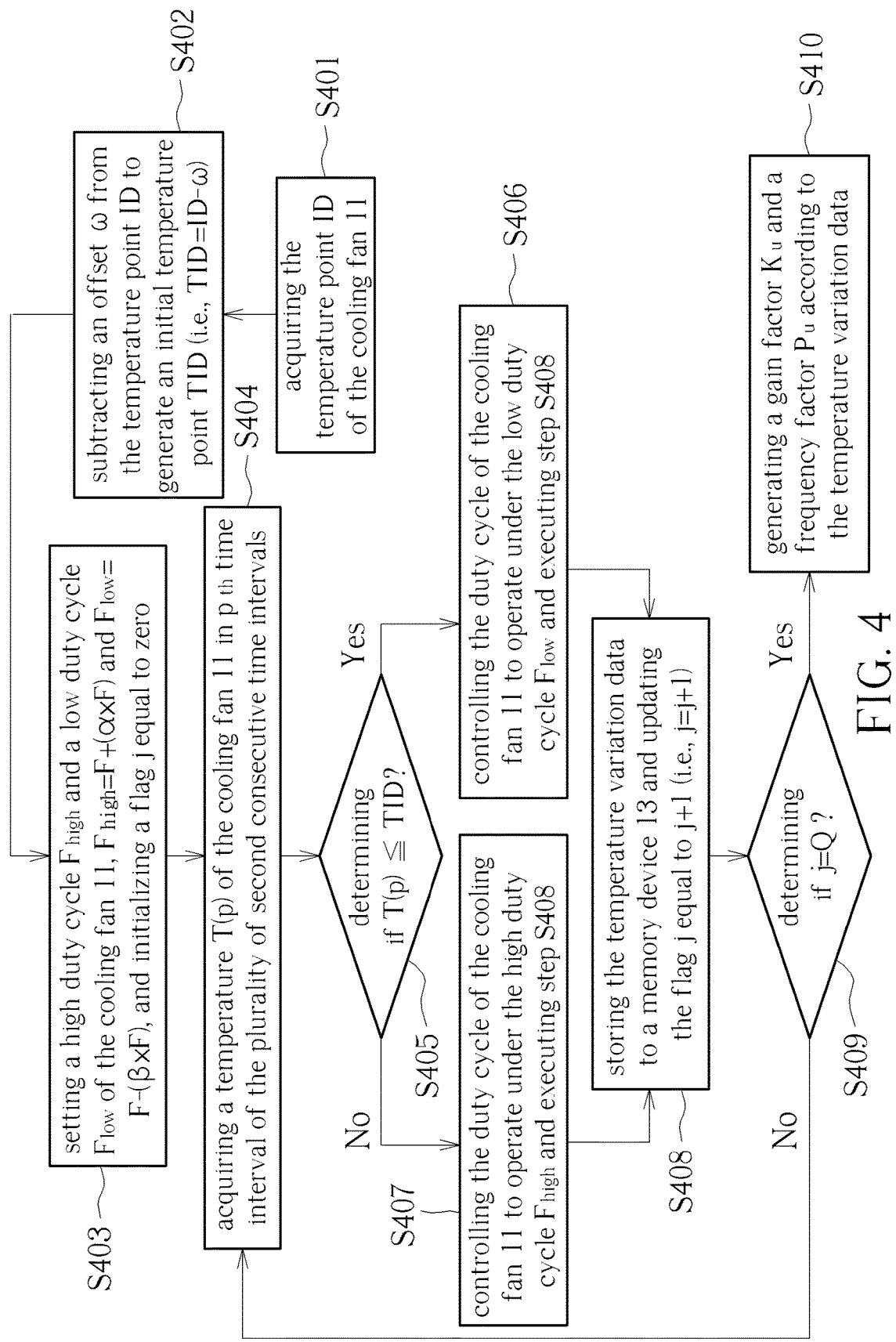
FIG. 4 is a flow chart of a system identification process in FIG. 2.

FIG. 4 is a flow chart of a system identification process. As aforementioned illustration, the system identification process corresponds to step S202. The system identification process includes step S401 to step S410, written as step S401: acquiring the temperature point ID of the cooling fan 11;

step S402: subtracting an offset $\omega$ from the temperature point ID to generate an initial temperature point TID (i.e., TID=ID−$\omega$);

step S403: setting a high duty cycle $F_{high}$ and a low duty cycle $F_{low}$ of the cooling fan 11, $F_{high}$=F+($\alpha$×F) and $F_{low}$=F−($\beta$×F), and initializing a flag j equal to zero;

step S404: acquiring a temperature T(p) of the cooling fan 11 in $p^{th}$ time interval of the plurality of second consecutive time intervals;

step S405: determining if T(p)<TID. If so, executing step S406, else executing step S407;

step S406: controlling the duty cycle of the cooling fan 11 to operate under the low duty cycle $F_{low}$ and executing step S408;

step S407: controlling the duty cycle of the cooling fan 11 to operate under the high duty cycle $F_{high}$ and executing step S408;

step S408: storing the temperature variation data to a memory device 13 and updating the flag j equal to j+1 (i.e., j=j+1);

step S409: determining if j=Q. If so, executing step S410, else going back to step S404;

step S410: generating a gain factor $K_u$ and a frequency factor $P_u$ according to the temperature variation data.

In step S401, the processor 10 acquires the temperature point ID of the cooling fan 11. Specifically, the temperature point ID can be generated by using step S301 to step S308 in FIG. 3. In step S402, the processor 10 subtracts the offset $\omega$ from the temperature point ID to generate the initial temperature point TID satisfying TID=ID−$\omega$. Here, the offset $\omega$ can be a user-defined value, such as 0.01. The reason of slightly reducing the temperature point ID is illustrated later. In step S403, the processor 10 sets the high duty cycle $F_{high}$ and the low duty cycle $F_{low}$ of the cooling fan 11. Here, the high duty cycle $F_{high}$ is equal to F+($\alpha$×F). The low duty cycle $F_{low}$ is equal to F−($\alpha$×F). The flag j is also initialized to equal to zero. F is defined as an initial duty cycle. The high duty cycle $F_{high}$ can be defined as a sum of the initial duty cycle F and a specific proportion factor $\alpha$ multiplied by the initial duty cycle F. For example, the initial duty cycle F can be equal to 50%. The proportion factor $\alpha$ can be equal to 10%. Thus, the high duty cycle $F_{high}$ is equal to 50%+(10%×50%)=55%. The low duty cycle $F_{low}$ can be defined as a difference between the initial duty cycle F and a specific proportion factor $\beta$ multiplied by the initial duty cycle F. For example, the initial duty cycle F can be equal to 50%. The proportion factor $\beta$ can be equal to 10%. Thus, the low duty cycle $F_{low}$ is equal to 50%−(10%×50%)=45%. Specifically, the proportion factors $\alpha$ and $\beta$ can be two user-defined values satisfying 10%≥$\alpha$≥3% and 10%≥$\beta$≥3%. Then, in step S404, the temperature sensor 12 acquires the temperature T(p) of the cooling fan 11 in $p^{th}$ time interval of the plurality of second consecutive time intervals. Here, p is denoted as an index of $p^{th}$ time interval. For example, the temperature sensor 12 can acquire a temperature T (p=1) in a first time interval of the plurality of second consecutive time intervals. The temperature sensor 12 can acquire a temperature T(p=2) in a second time interval of the plurality of second consecutive time intervals, and so on. Without loss of generality, a temperature in the $p^{th}$ time interval is denoted as T(p) in step S404. In step S405, the processor 10 determines if T(p) TID. When T(p) TID, execute step S406. When T(p)>TID, execute step S407. In other words, the initial temperature point TID can be regarded as a threshold. When a high temperature is detected by the temperature sensor 12 (i.e., T(p)>TID), the current duty cycle of the cooling fan 11 is insufficient. Thus, the duty cycle of the cooling fan 11 is increased to reach a high duty cycle $F_{high}$. When a normal temperature is detected by the temperature sensor 12 (i.e., T(p)≤TID), the current duty cycle of the cooling fan 11 is sufficient. Thus, the duty cycle of the cooling fan 11 is decreased to reach a low duty cycle $F_{low}$ for power saving. Specifically, no matter which duty cycle is used, the temperature sensor 12 continuously detects temperature variation of the cooling fan 11. The temperature variation data can be stored to the memory device 13 in step S408. The flag j is also updated equal to j+1. In the following, the processor 10 determines if j=Q in step S409. When j=Q, execute step S410. When j≠Q, go back to step S404. Here, Q is a user-defined positive integer or a system default positive integer. Particularly, in the system identification process of the embodiment, sufficient statistic data is required for proceeding further analysis. When the flag j is large enough (j=Q), it implies that the temperature variation data is sufficient. Thus, the processor 10 can generate the gain factor $K_u$ and the frequency factor $P_u$ according to the temperature variation data in step S410. On the contrary, when the flag j is too small (i.e., for example, J<Q), the processor 10 executes step S404 again. The temperature sensor 12 continuously samples the temperature of the cooling fan 11 until the temperature variation data is sufficient.

Figure 5A:
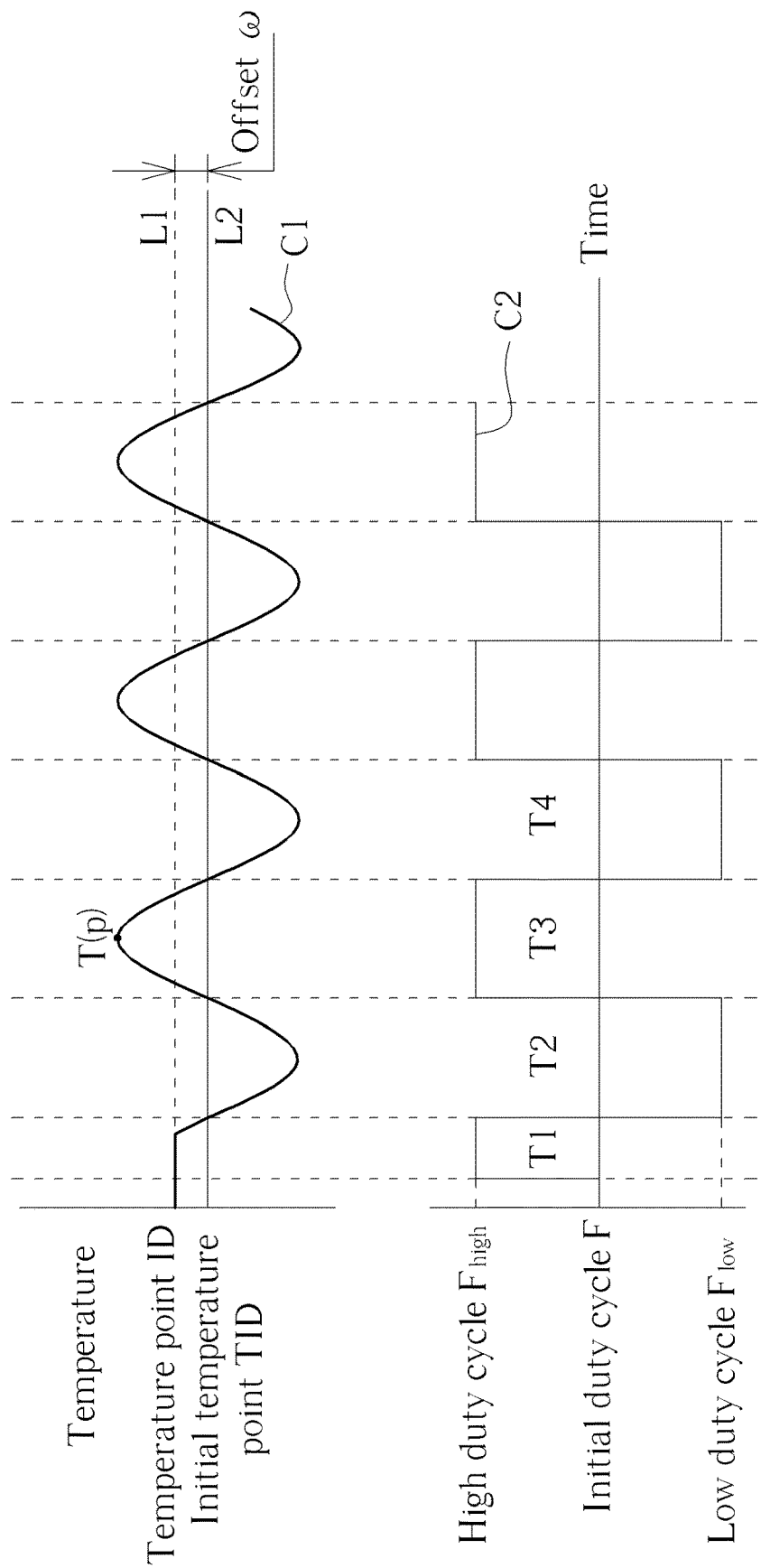
FIG. 5A is an illustration of a temperature curve and a duty cycle of the cooling fan in FIG. 1.

For presentation completeness, a concrete example is introduced to illustrate the system identification process. FIG. 5A is an illustration of a temperature curve C1 and a duty cycle C2 of the cooling fan 11. As aforementioned illustration, the preprocessing process is followed by the system identification process. The temperature point ID can be generated by using the preprocessing process. Specifically, the temperature point ID is a stable temperature of the cooling fan 11. Thus, when the temperature point ID is directly used to be a threshold for increasing the duty cycle or reducing the duty cycle, the duty cycle only has insignificant fluctuation since the cooling is operated under a stable condition (or say, temperature sampled by the temperature sensor 12 is substantially equal to the temperature point ID). Thus, for acquiring analyzable temperature variation data, the offset ω is subtracted from the temperature point ID. In other words, a level L1 of the temperature point ID becomes a level L2 of the initial temperature point TID. Since the initial temperature point TID is smaller than the temperature point ID and the initial temperature point TID is defined as the threshold for controlling the cooling fan 11 to operate under the high duty cycle $F_{high}$ or the low duty cycle $F_{low}$, the cooling fan 11 is unstable during a time interval T1 after a slight delay. For example, the processor 10 determines that the temperature point TID is smaller than a sampled temperature of the temperature curve C1 at a beginning of the time interval T1. The high duty cycle $F_{high}$ is used in the cooling fan 11 during the time interval T1 in step S407. Then, since the cooling fan 11 performs the high duty cycle $F_{high}$ for improving capability of heat dissipation, the temperature of the cooling fan 11 is decreased. When the temperature of the cooling fan 11 is smaller than the initial temperature point TID, the low duty cycle $F_{low}$ is used in the cooling fan 11 during the time interval T2 in step S406. Then, since the cooling fan 11 performs the low duty cycle $F_{low}$, the capability of heat dissipation is also reduced. As a result, the temperature of the cooling fan 11 is increased. When the temperature of the cooling fan 11 is greater than the initial temperature point TID, the high duty cycle $F_{high}$ is used in the cooling fan 11 during the time interval T3 in step S407, and so on. The duty cycle C2 of the cooling fan 11 over time (X-axis in FIG. 5A) can be regarded as a pulse width modulation waveform C2. The temperature curve C1 after time interval T2 is approximately a sinusoidal waveform (or say, sinusoidal function).

Figure 5B:
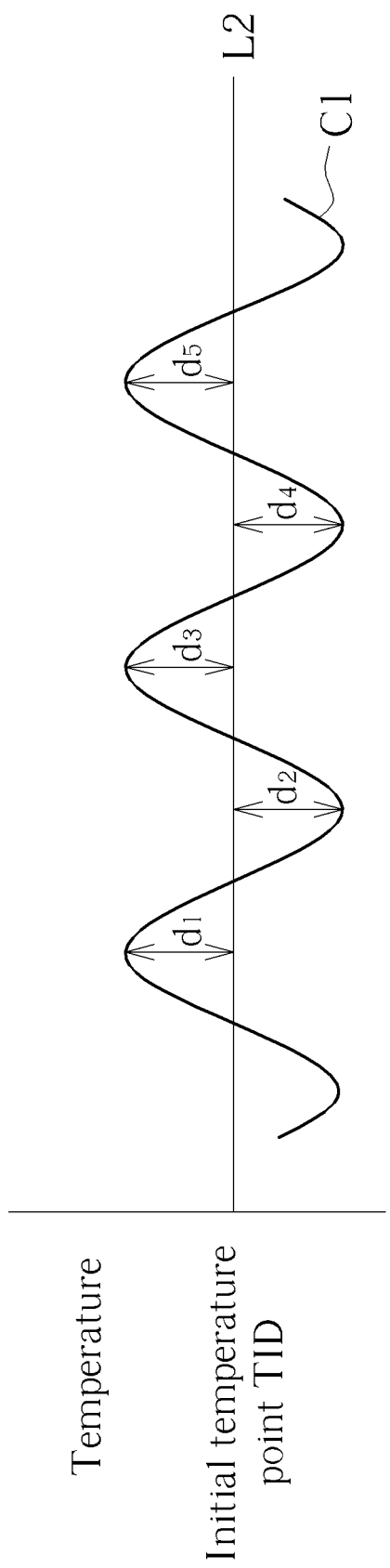
FIG. 5B is an illustration of amplitudes of the temperature curve.

FIG. 5B is an illustration of amplitudes of the temperature curve C1. FIG. 5B can be regarded as an auxiliary figure for illustrating the step S410. In step S410, the processor 10 generates the gain factor $K_u$ and the frequency factor $P_u$ according to the temperature variation data. Since the temperature curve C1 after time interval T2 can be modeled as the sinusoidal function, the frequency factor $P_u$ can be defined as a frequency value of the sinusoidal function. The standard measurement of the frequency factor $P_u$ is Hertz. The gain factor $K_u$ satisfies an equation, as $$K_u = (4 \times h)/(\pi \times a),$$

where h is a difference between the high duty cycle $F_{high}$ and the initial duty cycle F or a difference between the low duty cycle $F_{low}$ and the initial duty cycle F. For example, in the embodiment, the high duty cycle $F_{high}$ is equal to 50%+(10%×50%)=55%. The low duty cycle $F_{low}$ is equal to 50%−(10%×50%)=45%. Thus, h can be calculated as a predetermined constant equal to 5%. π is a circular constant substantially equal to 3.1415926. Constant a is an average amplitude of the sinusoidal function. In FIG. 5B, since the temperature curve C1 after time interval T2 can be modeled as the sinusoidal function, all amplitudes of the sinusoidal function can be observed. For example, the amplitude $d_1$ to the amplitude $d_5$ can be observed. Specifically, since sampling error is unavoidable, the amplitude $d_1$ to the amplitude $d_5$ may not be identical. For minimizing sample variance, the processor 10 can average the amplitude $d_1$ to the amplitude $d_5$ for generating an average amplitude $a = \sum_{t=1}^{5} d_t / 5$. However, the present invention is not limited to consider five amplitudes. For example, when Q is equal to 100, 8~10 full-waved sinusoidal waveforms can be obtained. Thus, the average amplitude becomes accurate since a lot of sinusoidal waveforms can be analyzed. After the average amplitude a and the difference h are calculated, the gain factor $K_u$ can be derived by $K_u = (4 \times h)/(\pi \times a)$.

In the following, the PID parameters calculation process corresponding to step S203 in FIG. 2 is executed. Here, three PID parameters including a proportional gain factor $K_c$, an integral time factor $T_i$, and a derivative time factor $T_d$ are introduced. The three PID parameters can be written as below.

$$K_c = K_u / 2.2$$

$$T_i = P_u / 0.45$$

$$T_d = P_u / 6.3$$

The gain factor $K_u$ and the frequency factor $P_u$ are defined previously. Thus, after the system 100 performs the preprocessing process, the system identification process, and the PID parameters calculation process, the proportional gain factor $K_c$, the integral time factor $T_i$, and the derivative time factor $T_d$ can be generated for driving the cooling fan 11 to operate under optimal condition.

To sum up, the present invention discloses a method and a system for optimizing control parameters of a cooling fan. Specifically, the system can automatically adjust, learning, and determine optimal PID parameters. Further, since sampled temperature data is required to be sufficient, the PID parameters generated by the system have very high reliability. Instead of using a trial and error process-based method for adjusting the PID parameters, the PID parameters generated by the system of the present invention can drive the cooling fan to operate under optimal condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for optimizing control parameters of a cooling fan comprising:

setting a temperature point of the cooling fan according to a plurality of temperatures corresponding to a plurality of first consecutive time intervals;

controlling a duty cycle of the cooling fan according to the temperature point;

acquiring temperature variation data of the cooling fan during a plurality of second consecutive time intervals, wherein the plurality of first consecutive time intervals are followed by the plurality of second consecutive time intervals;

generating a gain factor and a frequency factor of the cooling fan according to the temperature variation data; and generating a proportional gain factor, an integral time factor and a derivative time factor of a proportional-integral-derivative controller of the cooling fan according to the gain factor and the frequency factor of the cooling fan;

wherein controlling the duty cycle of the cooling fan according to the temperature point, acquiring the temperature variation data of the cooling fan during the plurality of second consecutive time intervals, and generating the gain factor and the frequency factor of the cooling fan according to the temperature variation data comprise:

subtracting an offset from the temperature point to generate an initial temperature point;

setting a high duty cycle and a low duty cycle of the cooling fan;

acquiring a temperature of the cooling fan in each time interval of the plurality of second consecutive time intervals;

controlling the duty cycle of the cooling fan to operate in the low duty cycle and storing the temperature variation data to a memory device if the temperature is smaller than the initial temperature point;

controlling the duty cycle of the cooling fan to operate in the high duty cycle and storing the temperature variation data to the memory device if the temperature is greater than the initial temperature point; and generating the gain factor and the frequency factor according to the temperature variation data of the plurality of second consecutive time intervals.

2. The method of claim 1, wherein setting the temperature point of the cooling fan according to the plurality of temperatures corresponding to the plurality of first consecutive time intervals comprises:

acquiring N temperatures corresponding to N first consecutive time intervals of the plurality of first consecutive time intervals;

averaging the N temperatures to generate an average temperature;

acquiring K temperature differences corresponding to K first consecutive time intervals of the plurality of first consecutive time intervals following the N first consecutive time intervals, wherein a $k^{th}$ temperature difference of the K temperature differences is a temperature difference between the average temperature and a temperature of a $k^{th}$ first time interval of the K first consecutive time intervals, N and K are two positive integers greater than two, and K≥k≥1; and if the K temperature differences are all smaller than a tolerance value, selecting one of K temperatures of the K first consecutive time intervals to be the temperature point of the cooling fan.

3. The method of claim 1, wherein setting the temperature point of the cooling fan according to the plurality of temperatures corresponding to the plurality of first consecutive time intervals comprises:

acquiring N temperatures corresponding to N first consecutive time intervals of the plurality of first consecutive time intervals;

averaging the N temperatures to generate an average temperature;

acquiring K temperature differences corresponding to K first consecutive time intervals of the plurality of first consecutive time intervals following the N first consecutive time intervals, wherein a $k^{th}$ temperature difference of the K temperature differences is a temperature difference between the average temperature and a temperature of a $k^{th}$ first time interval of the K first consecutive time intervals, N and K are two positive integers greater than two, and K≥k≥1; and when at least one of the K temperature differences is greater than a tolerance value, resampling temperatures of the cooling fan; and if K temperature differences of following K first consecutive time intervals are all smaller than the tolerance value, selecting one of K resampled temperatures of the following K first consecutive time intervals to be the temperature point of the cooling fan.

4. The method of claim 1, wherein the high duty cycle is equal to F+(α×F), 0.1≥α≥0.03, and F is an initial duty cycle.

5. The method of claim 1, wherein the low duty cycle is equal to F−(β×F), 0.1≥β≥0.03, and F is an initial duty cycle.

6. The method of claim 1, wherein a temperature curve corresponding to the temperature variation data is approximately a sinusoidal function, and the frequency factor is a frequency value of the sinusoidal function.

7. The method of claim 6, wherein the gain factor is equal to (4×h)/(π×a), h is a predetermined constant, and a is an average amplitude of the sinusoidal function.

8. The method of claim 1, wherein the proportional gain factor is equal to $K_u/2.2$, the integral time factor is equal to $P_u/0.45$, the derivative time factor is equal to $P_u/6.3$, $K_u$ is the gain factor, and $P_u$ is the frequency factor.

* * * * *